United States Patent
Wiesend (10) Patent No.: US 12,531,390 B2
(45) Date of Patent: Jan. 20, 2026

(54) ADAPTER ELEMENT FOR CONNECTING AN ELECTRONICS COMPONENT TO A HEAT SINK ELEMENT, SYSTEM COMPRISING AN ADAPTER ELEMENT OF THIS KIND, AND METHOD FOR PRODUCING AN ADAPTER ELEMENT OF THIS KIND

(71) Applicant: Rogers Germany GmbH, Eschenbach (DE)

(72) Inventor: Johannes Wiesend, Speinshart (DE)

(73) Assignee: ROGERS GERMANY GMBH, Eschenbach (DE)

( * ) Notice: Subject to any disclaimer, the term of this patent is extended or adjusted under 35 U.S.C. 154(b) by 1074 days.

(21) Appl. No.: 17/613,232

(22) PCT Filed: May 6, 2020

(86) PCT No.: PCT/EP2020/062503
§ 371 (c)(1),
(2) Date: May 5, 2022

(87) PCT Pub. No.: WO2020/233987
PCT Pub. Date: Nov. 26, 2020

(65) Prior Publication Data
US 2022/0271498 A1 Aug. 25, 2022

(30) Foreign Application Priority Data
May 23, 2019 (DE) ...................... 10 2019 113 714.4

(51) Int. Cl.
*H01S 5/024* (2006.01)
*H01S 5/0237* (2021.01)
(52) U.S. Cl.
CPC ........ *H01S 5/02476* (2013.01); *H01S 5/0237* (2021.01); *H01S 5/02423* (2013.01)

(58) Field of Classification Search
CPC ............. H01S 5/02476; H01S 5/02423; C04B 2237/704; H01L 23/473
(Continued)

(56) References Cited

U.S. PATENT DOCUMENTS 3,744,120 A 7/1973 Burgess et al.
6,352,873 B1 3/2002 Hoden

FOREIGN PATENT DOCUMENTS

DE 2319854 C2 12/1983
DE 19821544 A1 12/1999
(Continued)

OTHER PUBLICATIONS

International Preliminary Report On Patentability for International Application No. PCT/EP2020/062503, International Filing Date May 6, 2020, Date of Mailing Nov. 25, 2021, 10 pages.

*Primary Examiner* — Steve S Tanenbaum
(74) *Attorney, Agent, or Firm* — CANTOR COLBURN LLP (57) ABSTRACT

An adapter element (10) for connecting an electronic component (30) to a heat sink element (20), including an insulation layer (15) extending along a main extension plane (HSE), and at least a first web element (11) and a second web element (12), which are arranged next to each other in a direction parallel to the main extension plane (HSE), forming a free area (13), which, in the assembled state, are arranged between the insulating layer (15) and the electronic component (30) in a direction running perpendicular to the main extension plane (HSE), and on whose front sides (18) facing away from the insulating layer (15) the electronic component (30) is arranged in the assembled state, wherein a distance (A) between the first web element (11) and the second web element (12), measured in a plane parallel to the main extension plane (HSE), is smaller than 350 μm.

9 Claims, 4 Drawing Sheets

(58) Field of Classification Search
USPC .......................................................... 165/185
See application file for complete search history.

(56) References Cited

FOREIGN PATENT DOCUMENTS

| | | | | |
|---|---|---|---|---|
| DE | 102015013511 B3 * | 3/2017 | ........... | H01S 5/0237 |
| DE | 102016218522 B3 | 6/2017 | | |
| EP | 0805527 A2 | 11/1997 | | |
| EP | 1887666 A2 | 2/2008 | | |
| WO | 2008010944 A2 | 1/2008 | | |

* cited by examiner

ADAPTER ELEMENT FOR CONNECTING AN ELECTRONICS COMPONENT TO A HEAT SINK ELEMENT, SYSTEM COMPRISING AN ADAPTER ELEMENT OF THIS KIND, AND METHOD FOR PRODUCING AN ADAPTER ELEMENT OF THIS KIND

CROSS-REFERENCE TO RELATED APPLICATIONS

This application is a National Stage filing of PCT/EP2020/062503, filed May 6, 2020, which claims priority to DE 10 2019 113 714.4, filed May 23, 2019, both of which are incorporated by reference in their entirety herein.

BACKGROUND

The present invention concerns an adapter element for connecting an electronic component to a heat sink element, a system comprising such an adapter element, and a method of manufacturing such an adapter element.

It is well known from the prior art to cool electronic components that generate heat during operation by means of a corresponding heat sink element. For this purpose, such heat sink elements comprise, for example, one or more channels through which a cooling liquid is transported during operation of the electronic component. These heat sink elements are typically provided on the underside of the electronic components.

Furthermore, the prior art knows such electronic components which comprise a first connection region and a second connection region, wherein an active element region is formed between the first connection region and the second connection region. For example, the active element region is formed by a laser diode or a laser diode chip, and different electrical potentials are associated with the first terminal region and the second terminal region such that a voltage is dropped across the electronic component.

For the connection of such electronic components, it has proved advantageous to arrange adapter elements between the electronic component and the heat sink element, the adapter element primarily serving to electrically insulate the first connection region from the second connection region. Such adapter elements have proved to be particularly advantageous which have comb-like web elements projecting perpendicularly from an insulation layer, such that, in the assembled state, the first connection region and/or the second connection region of the system can each be arranged on the individual web elements or is respectively connected to them. Such adapter elements are manufactured by bonding a first metal layer to an insulation layer and subsequently by realizing free areas for forming the first web element and/or the second web element by means of an etching process.

Considering above, the present invention makes it its task to provide such adapter elements which are improved compared to those of the prior art, in particular with respect to their cooling capacity in the system which, in the assembled state, comprises the heat sink element in addition to the electronic component and the adapter element.

This task is solved by the disclosed adapter element, the disclosed system and the disclosed method. Preferred embodiments of the invention are discussed the following description, in particular in connection with the accompanying figures.

SUMMARY

According to a first aspect of the present invention, an adapter element for connecting at least one electronic component having a first connection region, a second connection region, and at least one active element region arranged between the first connection region and the second connection region to a heat sink element is provided, comprising:
an insulation layer extending along a main extension plane, and
at least a first web element and a second web element,
which are arranged next to each other in a direction parallel to the main extension plane, forming a free area,
which, in the assembled state, are arranged in a direction perpendicular to the main extension plane between the insulation layer and the electronic component and
on whose front sides facing away from the insulation layer, in the assembled state, the electronic component is arranged,
wherein a distance between the first web element and the second web element, measured in a plane parallel to the main extension plane, is less than 350 µm, preferably has a value between 100 µm and 300 µm and more preferably a value between 125 and 200 µm.

BRIEF DESCRIPTION OF THE FIGURES

Further advantages and features result from the following description of embodiments with reference to the attached figures. Individual features of the individual embodiment can thereby be combined with each other within the scope of the invention, which show, in.

DETAILED DESCRIPTION

Compared to the adapter elements known from the prior art, it is provided according to the invention to realize a smaller distance between the first web element and the second web element than is possible with the conventional etching methods for adapter elements from the prior art. For this purpose, in particular by means of machining, for example by using a saw, in particular a wafer saw, a small distance between the first and the second web element according is realized as is claimed.

Due to the comparatively very small distance between the first and the second web element, it is advantageously possible to enlarge a connection surface for the individual areas of the electronic component. In this case, the connection surfaces are formed on the front sides of the first web element and/or of the second web element facing away from the insulation layer. In other words, compared to the web elements known from the prior art, the claimed first web element and the second web element are advantageously dimensioned such that an enlarged contact area or connection region, via which the first web element makes contact, for example, with the first connection region and/or the second web element makes contact with an intermediate piece or the second connection region, is realized. As a result, the efficiency of heat dissipation can be significantly improved compared to adapter elements known in the prior art. As a result, the cooling efficiency of a system using the claimed adapter element as a link between the electronic component and the heat sink element can especially be optimized.

Preferably, the first web element and the second web element protrude from the insulation layer, in particular perpendicularly from the insulation layer, wherein, for example, the front side of the first web element provided for connecting the electronic component faces away from the insulation layer and is provided as a connection surface for the first connection region, while the front side of the second web element facing away from the insulation layer serves, for example, for connecting the second connection region and/or an intermediate piece. In this regard, the first face member and the second face member are made of a metal, for example, and the insulation layer is preferably made of a ceramic.

Preferably, the insulation layer comprises $Al_2O_3$, $Si_3N_4$, AlN, a HPSX ceramic (i.e. a ceramic with an $Al_2O_3$ matrix comprising an x-percentage of $ZrO_2$, for example $Al_2O_3$ with 9% $ZrO_2$=HPS9 or $Al_2O_3$ with 25% $ZrO_2$=HPS25), SiC, BeO, MgO, high-density MgO (>90% of the theoretical density), TSZ (tetragonally stabilized zirconium oxide) or ZTA as material for the ceramic. In this context, it is also conceivable that the insulating layer is formed as a composite or hybrid ceramic, in which, in order to combine various desired properties, a plurality of ceramic layers, which each differ in terms of their material composition, are arranged one above the other and are joined together to form an insulating layer. Preferably, a highly thermally conductive ceramic is used for the lowest possible thermal resistance.

As materials for the metal layer comprising the web elements, copper, aluminium, molybdenum and/or alloys thereof, as well as laminates such as CuW, CuMo, CuAl, AlCu and/or CuCu, in particular a copper sandwich structure with a first copper layer and a second copper layer, wherein a grain size in the first copper layer differs from a second copper layer, are conceivable.

Furthermore, it is preferably provided that a width of the first web element, the second web element and/or the third web element (measured parallel to the distance measurement of the distance between the first web element and the second web element) is measured in such a way that the width is approximately 0.5 to 0.95 times, preferably 0.6 to 0.95 times and more preferably 0.75 to 0.95 times an extension of that area of the electronic component, for example the first connection region, the second connection region and/or the intermediate piece, preferably 0.6 to 0.95 times and more preferably 0.75 to 0.95 times an extension of that region of the electronic component, for example the first connection region, the second connection region and/or the intermediate piece, which rests on the front side of the corresponding first web element, the second web element or the third web element, respectively. of the third web element, respectively. For example, a width of the first web element, the second web element and/or the third web element has a value between 0.5 mm and 3.0 mm, preferably between 0.8 mm and 2.50 and more preferably between 1.00 and 2.00 mm.

Furthermore, it is provided that the first web element and the second web element form a comb-like structure in a sectional view of the adapter element and the individual web elements, i.e. the first web element and/or the second web element, are preferably extended longitudinally parallel to one another in a direction running parallel to the main extension plane. More preferably, it is provided that the connection region, the second connection region and/or an intermediate piece are each connected to at least one first web element and/or second web element. Preferably, it is conceivable that the first connection region, the second connection region and the intermediate piece are each connected to exactly one first web element and/or second web element and/or third web element. Furthermore, it is more preferably provided that the distance between the first web element and the second web element is established at the level of the front side of the first web element and/or second web element. Furthermore, it is conceivable that, in addition to the first web element, the second web element and/or the third web element, at least a fourth web element is provided which remains unoccupied in the assembled state, i.e., on the front side of which no region is provided for the electronic component to be deposited on in the assembled state.

Preferably, an active element region is the region defined by the extent of a functional unit. For example, the functional unit is a laser diode and/or a laser diode chip which is intended to emit light and, in operation, is supplied with a voltage via the first connection region and the second connection region. In this regard, it is typically provided that the active element region does not contact or rest on the first web element and/or the second web element and/or the adapter element. Rather, it is provided that the active element region is arranged above the free area between the first web element and the second web element, preferably substantially centrally.

Preferably, it is provided that the first web element and the second web element are part of a metal layer and/or wherein the first web element and the second web element are flush with each other at the upper side of the adapter element, i. e. the front side of the first web element and the front side of the second web element are arranged at a common height in a direction perpendicular to the main extension plane. Furthermore, it is preferably provided that the metal layer has a first thickness and the insulation layer has a second thickness. For example, the first thickness in a direction perpendicular to the main extension plane has a value between 0.1 and 2 mm and the second thickness in the same direction has a value between 0.15 and 1 mm. More preferably, a so-called residual metal thickness, i.e. a thickness of the solid or closed region of the metal layer, in particular a residual copper thickness, of 0.1 to 0.3 mm is set or realized. The insulation layer has a second thickness of between 0.1 and 1.5 mm, preferably between 0.1 and 1 mm and more preferably between 0.1 and 0.6 mm. Furthermore, it is preferably provided that on the underside of the adapter element the heat sink element is provided, wherein the heat sink element extends substantially parallel to the main extension direction and comprises at least one cooling channel which is suitable for guiding a cooling liquid substantially parallel to the main extension plane so that, for example, a cooling liquid can be guided along the insulation layer and thus be used for heat dissipation.

According to a preferred embodiment, it is provided that a ratio of an extension of the active element region measured parallel to the main extension plane to the distance between the first web element and the second web element measured parallel to the main extension has a value between 0.7 and 1, preferably a value between 0.85 and 1 and more preferably a value of substantially 0.99. In this way, it is advantageously possible to configure the free areas serving for insulation such that they are somewhat larger than the dimensioning or extension of the active element region. Correspondingly large and thermally efficient, the front sides of the first and second web elements can be designed as contact surfaces. In particular for a value of 0.8 or a ratio between 0.75 and 0.85, the distance is dimensioned such that a sufficiently large manufacturing tolerance can be ensured when connecting the electronic component to the adapter element, so that there is no need to fear that the active element region will inadvertently come into contact with the first and/or second web element when connecting the electronic component to the adapter element.

Advantageously, it is provided that in an assembled state the active element region is arranged above the free area in a direction perpendicular to the main extension, in particular it is provided that the active element region is arranged between the first web element and the second web element as seen in a direction parallel to the main extension plane, preferably arranged centrally between the first web element and the second web element.

Preferably, the free area formed between the first web element and the second web element extends into the insulation layer. For example, a depth of the free area measured in a direction perpendicular to the main extension plane (as viewed from the front side of the first web element) is greater than a first thickness of the metal layer. In other words, a bottom of the free area is located within the insulation layer. As a result, the insulating capability of the adapter element can be further improved. In this regard, it has been found to be particularly advantageous that during the machining production of the free areas, these free areas which engage or are recessed into the insulation layer can be produced more easily than those which would otherwise have to be realized by a two-step etching process.

In another preferred embodiment of the present invention, it is provided that the first web element and/or the second web element extend from a first side of the adapter element to a second side opposite to the first side of the adapter element. In other words, the first web element and/or the second web element preferably extend continuously, along a direction parallel to the main extension plane over a complete transverse extension and/or longitudinal extension of the adapter element, i.e. over the entire width and/or length. Such first and second web elements can be produced comparatively easily, in particular during sawing by means of a saw blade, in particular if a plurality of future adapter elements are arranged next to one another and then the free areas for a plurality of adapter elements are jointly implemented in one sawing operation. Moreover, it proves advantageous to arrange a plurality of such adapter elements side by side, whereby the cooling capacity of the system is further improved, since additionally transversely or vertically extending web elements can be dispensed with. Preferably, it is provided that the adapter element does not comprise a web element extending transversely and/or perpendicularly to the first and second web element.

Preferably, it is provided that in the assembled state the first connection region is arranged on the first web element and the second connection region is arranged on the second web element, in particular rests thereon. In other words, the first web element is associated with the first connection region and the second web element is associated with the second connection region. Accordingly, the distance between the first web element and the second web element is such that the area with the active element can be bridged with the free area between the first web element and the second web element. In particular, it is provided that the first web element and the second web element are each electrically connected to the first or the second connection region, respectively.

In particular, no further web element or neither the first nor the second web element is arranged below the active element. This advantageously forms a region free of web elements between the insulating layer and the electrical component. In particular, a free area is formed between the electrical component and the insulation layer. As a result, it is advantageously possible, for example, to simplify the connection process of the electrical component, since a component between the first web element and the second web element does not have to be taken into account, in particular with regard to a possible contact with the active element.

Furthermore, it is preferably provided that a first thickness of the first web element and/or of the second web element is greater than a width of the first web element and/or of the second web element, wherein the width of the first web element and/or of the second web element is to be measured along a direction defining the distance between the first web element and the second web element. This advantageously provides the first web element and/or the second web element with sufficient heat capacity, which proves to be an advantageous buffer for the dissipation of heat, in particular in an overload situation. Preferably, the first thickness is more than 2 times, preferably more than 5 times and more preferably more than 8 times the width of the first web element and/or the second web element.

Preferably, it is provided that in the assembled state a single first web element is arranged below the first connection region and/or in the assembled state a single second web element is arranged below the second connection region. As a result, exactly one first and one second web element are associated with the first connection region and the second connection region, respectively. In other words, the first and second web elements form an uninterrupted body whose width preferably corresponds substantially to the extent of the first connection region and the second connection region, respectively, measured in the same direction. This provides the largest possible contact area, and in particular an uninterrupted contact area.

In particular, the first web element is arranged immediately adjacent to the second web element, that is, the free area between the first web element and the second web element, which are in contact with the first connection region and the second connection region, respectively, is adjacent to both the first web element and the second web element.

Furthermore, it is preferably provided that in the assembled state a single first web element is arranged below the first connection region and/or in the assembled state a single second web element is arranged below the second connection region.

For example, it is provided that the first thickness of the first web element and/or the second web element is greater than a thickness of the insulation layer.

Preferably, it is provided that the free area has an aspect ratio between 1 and 25, preferably between 1 and 15 and more preferably between 1.5 and 3.

Very large aspect ratios can be achieved by means of machining, in particular by production by means of a wafer saw, which would not be possible with the usual etching processes. By etching, at best a limited aspect ratio can be set, especially if a residual metal thickness of about 0.2 mm is to be realized. Previously, it was common practice to reduce the residual metal thickness in order to realize finer structures, in particular by first reducing the residual metal thickness to 0.2 mm, followed by structure etching, and finally using a diamond cutter to reduce the metal layer to 0.1 mm. Although trenches with a depth of 0.3 mm can be produced, the reduction of the residual metal thickness leads in an undesirable way to a limited use of the heat spread. In other words, the proposed process allows the realization of comparatively large aspect ratios without having to sacrifice the advantageous formation of a sufficiently large residual metal thickness.

According to a further embodiment of the present invention, it is envisaged that a plurality of free areas are provided, wherein a distance between two adjacent free areas varies along a direction parallel to the main extension plane. In particular, it is conceivable that the distances between two adjacent free areas are adapted to the respective dimensioning of the first connection region, of the second connection region and/or of the intermediate piece, whereby a preferably optimized contact surface can be realized at the respective front sides of the first and/or of the second and/or of the third web element. This makes it possible to further optimize the cooling efficiency of the system as a whole.

A further aspect of the present invention is a system for cooling an electronic component, comprising:
   an adapter element according to the invention and
   a heat sink element which is connected to the insulation layer on its side facing away from the first and second web elements, wherein in the assembled state the adapter element is arranged between the electronic component and the heat sink element. All features and advantages described for the adapter element can be transferred analogously to the system for cooling an electronic component and vice-versa.

According to a further embodiment, it is provided that the system comprises a plurality of adapter elements arranged side by side. Preferably, the adapter elements are arranged next to each other in such a way that the first web elements of the various adapter elements are arranged in alignment with each other, that is, the individual web elements continue their course as seen over the various adapter elements. Thus, a large contact surface for connecting the electronic components is realized, which realizes an improved cooling efficiency due to this corresponding geometry or arrangement.

Another aspect of the present invention is a method of manufacturing an adapter element according to the invention, comprising
   providing an insulation layer,
   providing a metal layer,
   bonding the metal layer to the insulation layer, preferably by means of a direct metal bonding method or an active soldering method,
   realizing a free area in the metal layer or realizing a free area into the metal layer and the insulation layer to form a first web element and a second web element,
wherein the free area is realized by machining, preferably by sawing with a saw blade. All advantages and features described for the adapter element and system can be transferred analogously to the method for producing an adapter element and vice-versa.

For example, the saw blade is a saw blade provided with diamonds and/or comprises a carbide.

It is particularly preferred that the bonding of the metal layer to the insulating layer is realized by a direct metal bonding process or an active soldering process.

According to a preferred embodiment of the present invention, it is provided that the metallization layer is bonded to the insulation layer by means of a DCB process or an active soldering process.

By a direct metal bonding process, such as a "DCB process" (direct copper bond technology) or "DAB process" (direct aluminium bond technology), the skilled person understands such a process which serves, for example, to bond metal layers or sheets (e.g. copper sheets or foils) to one another and/or to ceramics or ceramic layers, using metal or copper sheets or metal or copper foils which have a layer or coating (fusion layer) on their surface sides. In this process described, for example, in U.S. Pat. No. 3,744,120 A or in DE23 19 854 C2, this layer or coating (fusion layer) forms a eutectic with a melting temperature below the melting temperature of the metal (e.g. copper), so that by placing the foil on the ceramic and by heating all the layers, these can be bonded to one another, namely by melting the metal or copper essentially only in the region of the fusion layer or oxide layer.

In particular, the DCB process then has, for example, the following process steps:
   Oxidizing a copper foil in such a way that a uniform copper oxide layer is formed;
   Laying the copper foil on the ceramic layer;
   Heating the composite to a process temperature between about 1025 to 1083° C., e.g. to about 1071° C.; and
   Cooling to room temperature.

An active soldering process, e.g. for bonding metal layers or metal foils, in particular also copper layers or copper foils with ceramic material, is to be understood as a process which is also used specifically for producing metal-ceramic substrates. Here, at a temperature between about 650-1000° C., a bond is produced between a metal foil, for example a copper foil, and a ceramic substrate, for example aluminum nitride ceramic, using a brazing alloy which, in addition to a main component such as copper, silver and/or gold, also contains an active metal. This active metal, which is for example at least one element of the group Hf, Ti, Zr, Nb, Ce, establishes a connection between the brazing alloy and the ceramic by chemical reaction, while the connection between the brazing alloy and the metal is a metallic brazing connection.

Alternatively, a DAB process for aluminium metallisation and/or a thick-film process are also conceivable for bonding.

Further advantages and features result from the following description of preferred embodiments of the subject matter according to the invention with reference to the attached Figures. Individual features of the individual embodiment can be combined with each other within the scope of the invention.

Figure 1:
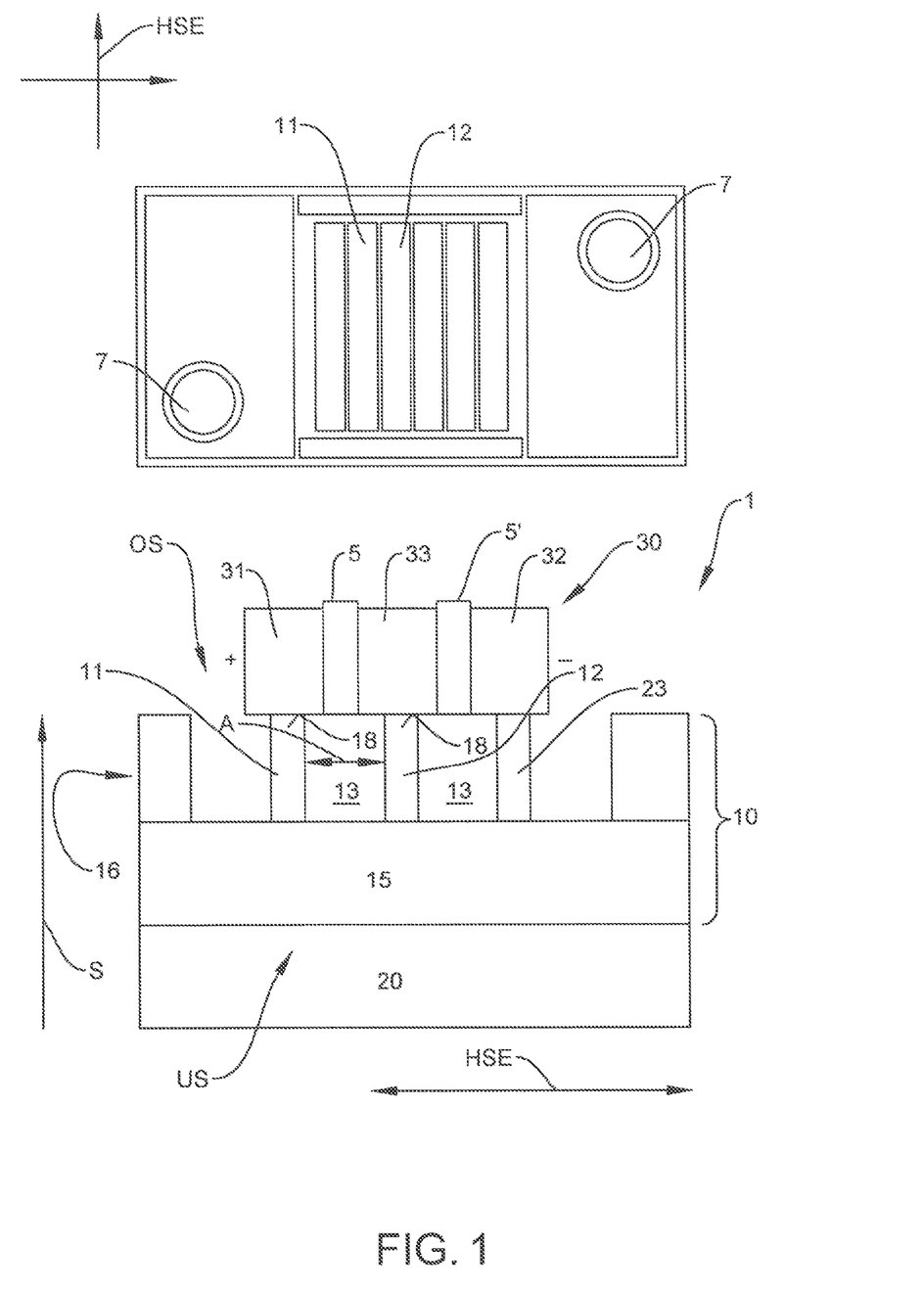
FIG. 1 A prior art adapter element in a plan view (top) and in a sectional view (bottom)

FIG. 1 shows an adapter element 10 for connecting an electronic component 30 to a heat sink element 20 according to the prior art. In particular, FIG. 1 above shows an adapter element 10 in a top view on a main extension plane HSE, while below a sectional view of the system 1 comprising adapter element 10, electronic component 30 and heat sink element 20 in the assembled state is illustrated. Here, the electronic component 30, which is connected to the heat sink element 20 via the adapter element 10 or is connected in the assembled state, has a first connection region 31 and a second connection region 32. At least one active element region 5 is thereby provided between the first connection region 31 and the second connection region 32. In the mountable state, the first connection region 31, the second connection region 32 and the active element region 5 are thereby arranged next to one another parallel to the main extension plane HSE.

In the embodiment shown in FIG. 1, a further active element region 5' is provided in addition to the active element region 5, the active element region 5 and the further active element region 5' being arranged between the first connection region 31 and the second connection region 32 and being separated from one another by an intermediate piece 33. In the assembled state, in particular in operation of the electronic component 30, it is thereby provided that the first connection region 31 and the second connection region 32 are at different electrical potentials, so that a voltage is formed which is dropped across the electronic component 30. The adapter element 10 has the task of electrically insulating individual areas of the electronic component 30, that is to say the first connection region 31, the second connection region 32 and/or the intermediate piece 33, from one another. For this purpose, the adapter element 10 comprises an insulation layer 15 extending substantially along a main extension plane HSE, which is preferably made of a ceramic.

At least a first web element 11 and a second web element 12 protrude from the insulation layer 15 in a direction perpendicular to the main extension plane HSE, the first web element 11 and/or the second web element 12 being made of metal. In the assembled state, the electronic component 30 is arranged, in particular bonded, to the front sides 18 of the first web element 11 and of the second web element 12, preferably the first connection region 31 being bonded to the front side 18 of the first web element 11 and the intermediate piece 33 being bonded to the front side 18 of the second web element 12. It is further provided that the second connection region 32 is bonded to a third web element 23. In particular, the electronic component 30 rests on an upper side OS of the adapter element 10. As a result, it is possible to electrically insulate the first connection region 31, the intermediate piece 33 and the third connection region from one another in each case, in particular by means of the insulation layer 15 of the adapter element 10 and the first web elements 11, second web elements 12 and/or third web elements 23 which are spaced apart from one another.

In this regard, it is further provided that the first web element 11, the second web element 12 and the third web element 23 are part of a metal layer 16 which is bonded to the insulating layer 15, for example by a DCB process and/or an active soldering process. In the assembled state, it is further provided that a heat sink element 20 is bonded to an underside US of the adapter element 10, that is in particular to a side opposite the first web element 11 and the second web element 12. Preferably, a cooling fluid flows through this heat sink element 20, the cooling fluid being introduced via corresponding openings 7 on an upper side OS of the system 1 comprising adapter element 10, electronic component 30 and heat sink element 20 and being initially introduced into the heat sink element 20 at one end along a direction running parallel to a stacking direction S (in the direction of the underside US). Within the heat sink element 20, the cooling fluid preferably flows substantially parallel to the main extension plane HSE to flow along the stacking direction S (in the direction of the upper side OS) to the upper side OS of the adapter element 10 at another end in order to leave the adapter element 10 or the system 1 again via the opening 7.

Figure 2:
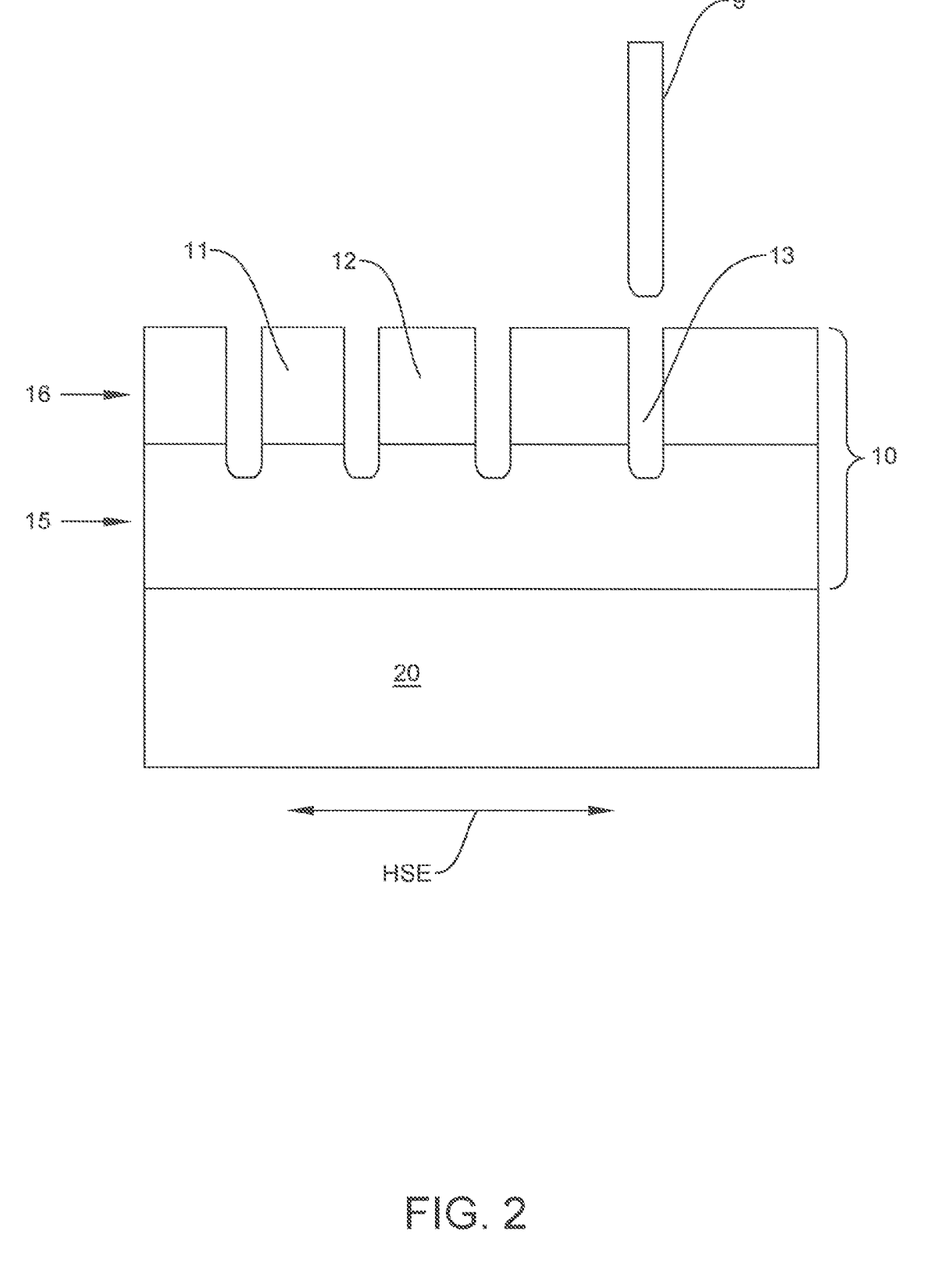
FIG. 2 A method of manufacturing an adapter element according to a preferred embodiment of the present invention.

FIG. 2 illustrates a method of manufacturing an adapter element 10 according to a preferred embodiment of the present invention. In particular, the method comprises providing a metal layer 16 and an insulating layer 15. After bonding the metal layer 16 to the insulating layer 15, preferably by means of a direct metal process, for example a DCB or DAB process, and/or an active soldering process, it is preferably provided in this case that free areas 13 are realized in the adapter element 10 by a machining operation.

As shown in FIG. 2, the free area 13 is realized in the adapter element 10 by means of a saw blade 9, in particular a wafer saw. The free area 13 separates the first web element 11 from the second web element 12 in the manufactured adapter element 10.

Furthermore, it is provided that by means of the machining operation the free area 13 extends into the insulation layer 15. In other words, a bottom 17 or termination of the free area 13 is localized within the insulation layer 15. Furthermore, it is conceivable that the heat sink element 20 is provided on the underside US of the insulation layer 15 or is already attached as soon as the free area 13 is realized by means of the saw blade 9. By means of the machining operation during the production of the free area 13, it is advantageously possible to realize a distance A between the first web element 11 and the second web element 12 which is smaller than 350 μm. Preferably, the distance A has a value between 100 μm and 300 μm and more preferably a value between 125 and 200 μm.

Figure 3:
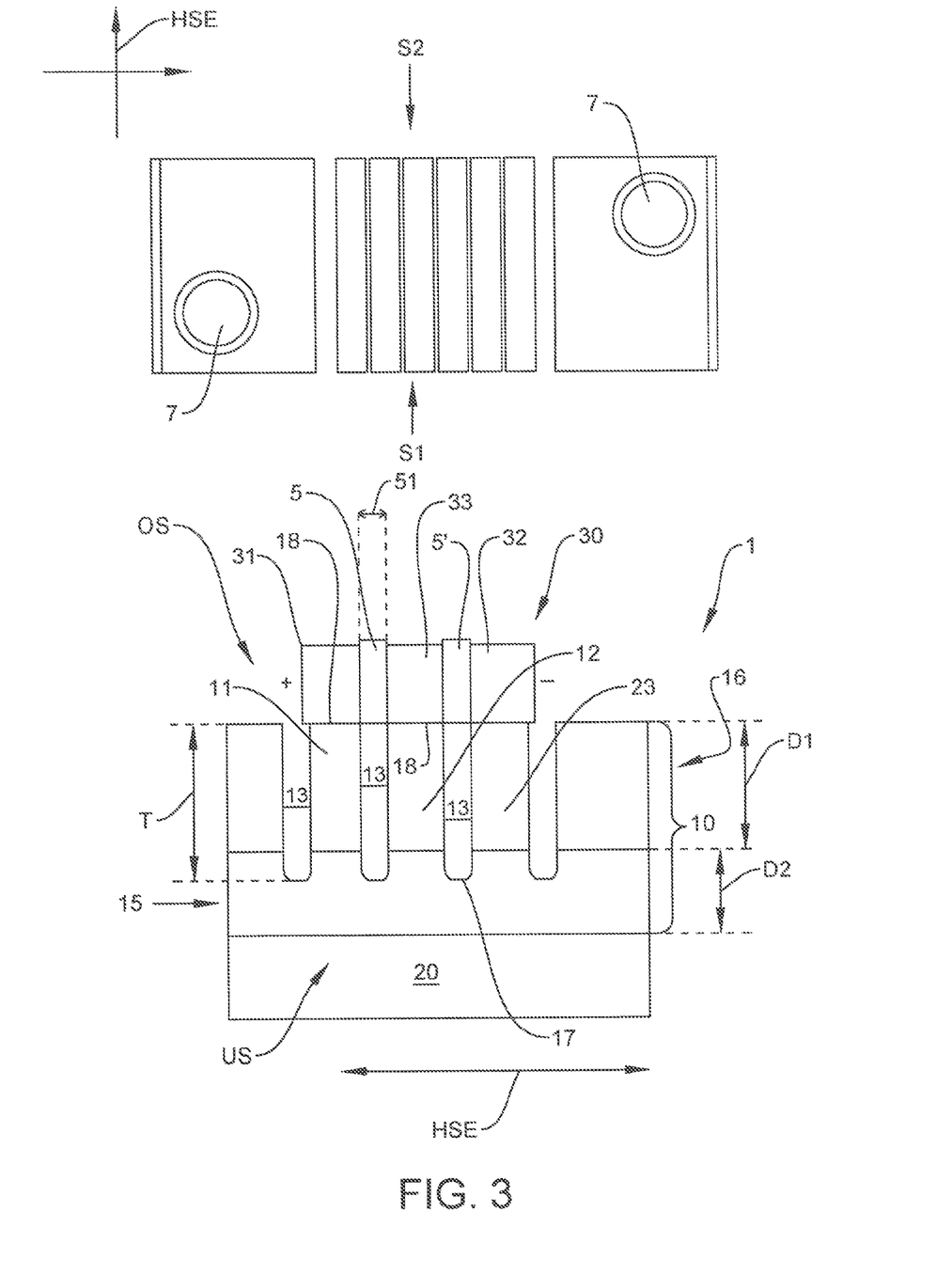
FIG. 3 An adapter element according to a preferred embodiment of the present invention.

FIG. 3 shows an adapter element 10 according to a preferred embodiment of the present invention. In particular, FIG. 3 shows at the top an adapter element 10 in a plan view of the main extension plane HSE, while at the bottom a sectional view of the system 1 comprising adapter element 10, electronic component 30 and heat sink element 20 in the assembled state is illustrated. Due to the machining operation, it is advantageously possible to realize free areas 13 which are significantly narrower compared to those of the prior art. Accordingly, a first web element 11 or a second web element 12 can be realized which provides a larger contact surface for the first connection region 31, the intermediate piece 33 and/or the second connection region 32 at its front sides 18. In this way, it is advantageously possible to increase the heat dissipation in comparison with such adapter elements 10 which contact the individual regions of the electronic component 30 by means of comparatively thin web elements 12, 12, 23. In particular, it is provided that the adapter element 10 is thereby composed of a metal layer 16 having a first thickness D1 and an insulation layer 15 having a second thickness D2, wherein the free areas 13 embedded in the adapter element 10 have a depth T which is greater than the first thickness D1, so that the individual free areas 13 project into the insulation layer. Furthermore, it is preferably provided that a ratio of the second thickness D2 to the first thickness D1 has a value between 0.3 and 0.8 preferably between 0.5 and 0.75 and more preferably 0.6 and 0.7.

Furthermore, it is preferably provided that a ratio of the first thickness to the depth T has a value between 0.6 and 0.95, preferably between 0.7 and 0.9 and more preferably between 0.75 and 0.85.

Furthermore, it is preferably provided that an extension 51 of the active element region 5 measured parallel to the main extension plane HSE is configured such that the active element region 5 is arranged above the free area 13 of the adapter element 10. In other words, the distance A between the first web element 11 and the second web element 12 is measured such that a ratio between the extent 51 of the active element region 5 and the distance A between the first web element 11 and the second web element 12 has a value between 0.7 and 0.9, preferably a value between 0.75 and 0.85 and more preferably a value of substantially 0.8. In this way, it is possible to advantageously realize the largest possible contact surface or contact area for the first connection region 31, the second connection region 32 and/or the intermediate piece 33 and, at the same time, to ensure that a comparatively easy-to-implement arrangement of the active element region 5 can be realized above the free area 13. In this context, it is in particular provided that the active element region 55 does not contact the adapter element 10, in particular does not contact the first web element 11 and/or the second web element 12. In other words, in a direction parallel to the main extension plane HSE, the active element region 5 is arranged between the first web element 11 and the second web element 12.

It is further provided that the comb-like first web elements 11 and/or second web elements 12 extend from a first side S1 of the adapter element 10 towards a second side S2 opposite to the first side S1. Thereby, the first web element 11 and the second web element 12 extend parallel to each other and fill the upper side OS from one side S1 to the second side S2, that is, there are no further web elements extending perpendicularly or obliquely to the first web element S11 and second web element S12, which form a termination at the first side S1 and/or second side S2 (cf. FIG. 1).

Figure 4:
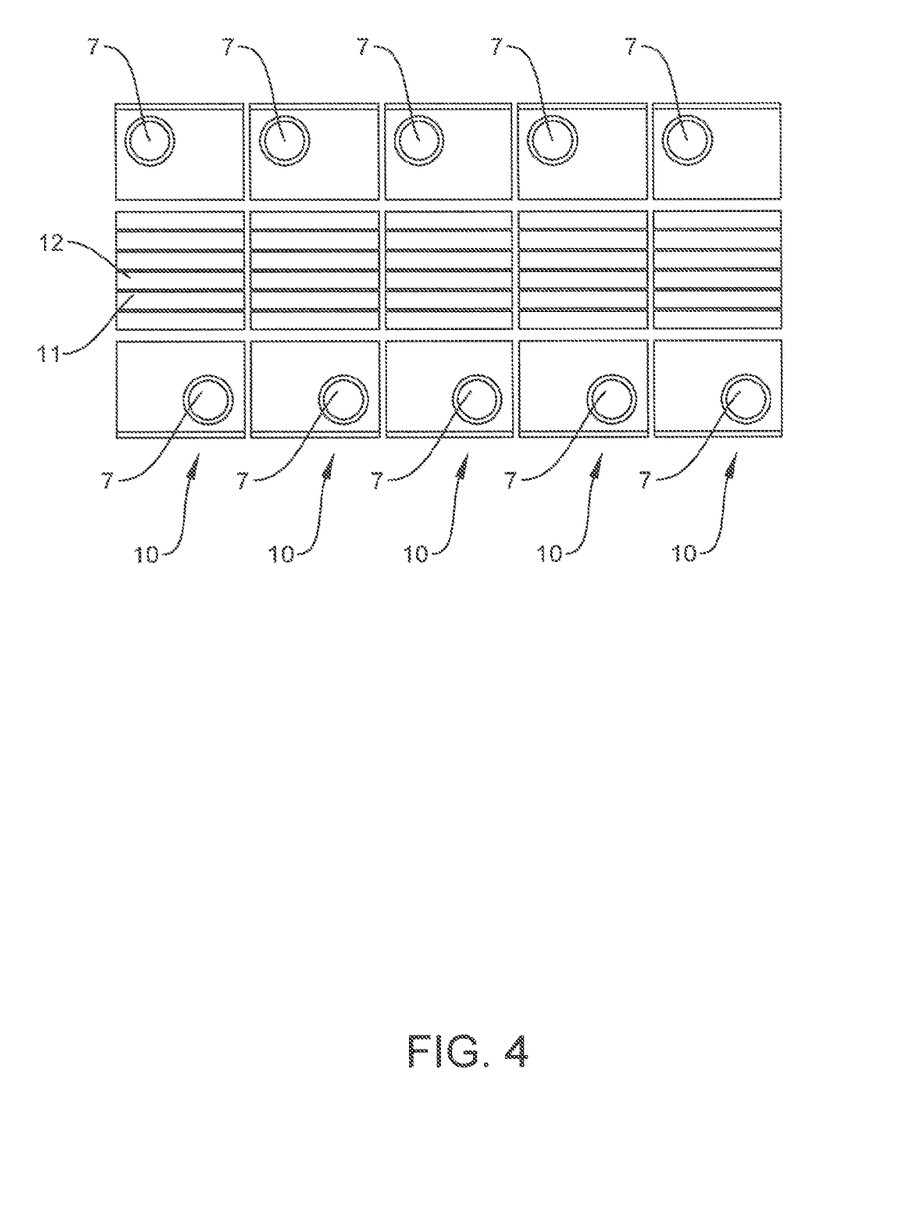
FIG. 4 An arrangement of a plurality of adapter elements according to a preferred embodiment of the present invention.

FIG. 4 illustrates a system 1 for cooling an electronic component 30 in which a plurality of adapter elements 10 are arranged side by side. In this case, the adapter elements 10 are arranged next to one another in such a way that the first web element 11 of an adapter element 10 and the first web element 12 of an adjacent adapter element 10 are arranged in alignment with one another. By arranging the individual adapter elements 10 directly next to each other, in particular in an aligned arrangement with respect to each other with respect to the first web elements 11 and/or second web elements 12, it is advantageously possible to further improve the performance of the heat sink element and/or of the entire system 1 for cooling the electronic component 30.

REFERENCE LIST

1 System
25 Active element region
5' Further active element region
7 Opening
9 Saw blade
10 Adapter element
11 First web element
12 Second web element
13 Free area
15 Insulation layer
16 Metal layer
17 Bottom
18 Front side
20 Heat sink element
23 Third web element
30 Electronic component
31 First connection region
32 Second connection region
33 Intermediate piece
51 Expansion
A Distance
S1 First side
S2 Second side
D1 First thickness
D2 Second thickness
OS Upper side
US Underside
T Depth
HSE Main extension level
S Stacking direction

The invention claimed is:

1. A system (1) for cooling an electronic component (30) including the electronic component (30), which has a first connection region (31), a second connection region (32) and at least one active element region (5) arranged between the first connection region (31) and the second connection region (32), and including an adapter element (10) for connecting the electronic component (30) to a heat sink element (20), the adapter element (10) further comprising:
an insulation layer (15) extending along a main extension plane (HSE), and
at least a first web element (11) and a second web element (12),
which are arranged next to each other in a direction parallel to the main extension plane (HSE), forming a free area (13) between the first web element and the second web element,
which, in the assembled state, are arranged between the insulating layer (15) and the electronic component (30) in a direction running perpendicular to the main extension plane (HSE), and
on whose front sides (18) facing away from the insulating layer (15) the electronic component (30) is arranged in the assembled state,
wherein the first web element (11) and the second web (12) element are part of a metal layer, the metal layer having a first thickness, wherein the first thickness has a value between 0.1 and 2 mm, wherein a distance (A) between the first web element (11) and the second web element (12), measured in a plane parallel to the main extension plane (HSE), has a value between 100 µm and 300 µm, the system (1) further comprising the heat sink element (20), which is connected to the insulation layer (15) on its underside (US) facing away from the first web element (11) and the second web element (12), the adapter element (10) being arranged between the electronic component (30) and the heat sink element (20) in the assembled state characterized in that a region free of web elements between the insulating layer and the electrical component is formed, wherein a distance between the first web element and the second web element is such that the at least one active element region can be bridged with the free area between the first web element and the second web element.

2. The system (1) according to claim 1, wherein a ratio of an extension (51) of the active element region (5), measured parallel to the main extension plane (HSE), to the distance (A) between the first web element (11) and the second web element (S2), measured parallel to the main extension plane (HSE), has a value between 0.7 and 1.

3. The system (1) according to claim 1, wherein the first web element (11) and/or the second web element (12) extends from a first side (S1) of the adapter element (10) to a second side (S2) opposite the first side (S2) of the adapter element (10).

4. The system (1) according to claim 1, wherein, the first connection region (31) is arranged on the first web element (11) and the second connection region (32) is arranged on the second web element (12), in particular rests thereon.

5. The system (1) according to claim 1, wherein a first thickness (D1) of the first web element (11) and/or the second web element (12) is greater than a width of the first web element (12) and/or the second web element (12), wherein the width of the first web element (11) and/or the second web element (12) is to be measured along a direction defining the distance between the first web element and the second web element.

6. The system (1) according to claim 1, wherein the first web element (11) is arranged immediately adjacent to the second web element (12).

7. The system (1) according to claim 1, wherein, a single first web element (11) is arranged below the first connection region (31) and/or, a single second web element (12) is arranged below the second connection region (32).

8. The system (1) according to claim 1, wherein the first thickness of the first web element (11) and/or second web element (12) is greater than a thickness of the insulation layer (15).

9. The system (1) according to claim 1, wherein a plurality of free areas (13) are provided, wherein a distance between two adjacent free areas (13) varies along a direction parallel to the main extension plane (HSE).

* * * * *